(12) United States Patent
Lee et al.

(10) Patent No.: US 8,218,534 B2
(45) Date of Patent: Jul. 10, 2012

(54) VOIP ANOMALY TRAFFIC DETECTION METHOD WITH FLOW-LEVEL DATA

(75) Inventors: Youngseok Lee, Daejeon (KR); Hyeongu Son, Daejeon (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 303 days.

(21) Appl. No.: 12/621,210

(22) Filed: Nov. 18, 2009

(65) Prior Publication Data

US 2010/0284288 A1    Nov. 11, 2010

(30) Foreign Application Priority Data

May 7, 2009    (KR) .................. 10-2009-0039656

(51) Int. Cl.
*H04L 12/66* (2006.01)
*H04L 12/28* (2006.01)
*G06F 15/173* (2006.01)
*G06F 9/00* (2006.01)

(52) U.S. Cl. .......... 370/352; 726/13; 709/224; 370/389

(58) Field of Classification Search .......... 370/352, 370/356, 400, 401, 241, 244, 248, 251, 252, 370/389, 392, 394, 351; 379/22.03, 8, 12, 27.03, 27.01, 100.05; 726/22, 23, 13; 709/224–226

See application file for complete search history.

(56) References Cited

U.S. PATENT DOCUMENTS

| | | | |
|---|---|---|---|
| 7,568,224 B1 * | 7/2009 | Jennings et al. | 726/14 |
| 7,738,373 B2 * | 6/2010 | Lerner | 370/232 |
| 7,764,697 B2 * | 7/2010 | Rana et al. | 370/401 |
| 7,940,684 B2 * | 5/2011 | Boyes et al. | 370/250 |
| 7,995,477 B2 * | 8/2011 | Atkins et al. | 370/235 |

* cited by examiner

*Primary Examiner* — Hanh Nguyen
(74) *Attorney, Agent, or Firm* — Edwards Wildman Palmer LLP

(57) ABSTRACT

The present invention relates to a method and system of detecting anomaly traffic for VoIP applications, in which a router captures an IP packet of a VoIP flow being transmitted, the captured IP packet is classified into an SIP message and a RTP traffic, header information is extracted from the classified SIP message and RTP traffic, the extracted header information is stored in a database, and whether SIP-based anomaly traffic or RTP-based anomaly traffic is generated is determined based on the extracted and stored information, and to a system therefor.

8 Claims, 6 Drawing Sheets

VoIP application anomaly traffic detection server

VOIP ANOMALY TRAFFIC DETECTION METHOD WITH FLOW-LEVEL DATA

CROSS-REFERENCE TO RELATED APPLICATIONS

This application claims the benefit under 35 U.S.C. §119 (a) of Korean Patent Application No. 2009-39656 filed on May 7, 2009, the entire content of which is incorporated herein by reference.

BACKGROUND

1. Technical Field

The present disclosure relates to a method of detecting anomaly traffic for Voice over Internet Protocol (VoIP) applications using Session Initiation Protocol (SIP)/Real-time Transport Protocol (RTP) through traffic monitoring over a network.

2. Background Art

The term VoIP refers to a collection of transmission technologies for delivery of voice traffic between users employing Internet Protocols (IPs) over IP-based networks, thereby enabling Internet telephony communications services. That is, VoIP enables transmission of voice data in the digital form over the Internet. The VoIP technique, which has been spotlighted since Internet phones were commercialized in 1995, is widely popularized such that an increasing number of international telecommunications service operators use the technique for the purpose of reducing call charges and an increasing number of people use Internet phones based on the technique.

Since the VoIP service is a media service performed through the call connection between two parties, a protocol for establishing the call connection is needed. Also, the VoIP service must be operated cooperatively in an IP-based network, a Public Switched Telephone Network (PSTN), or a combined network thereof, and thus standardization of the technology and the protocol is very important.

Examples of the standard connection protocol include H.323 developed by International Telecommunication Union (ITU-T) and Session Initiation Protocol (SIP) developed by Internet Engineering Task Force (IETF). Recently, the SIP is widely used as a protocol for delivering signal messages to connect VoIP phones between users as having been adopted as a de jure standard of the IETF in 1999, and is spotlighted as a next-generation VoIP signaling protocol. In addition, the SIP has advantages in that it is simpler than the H.323 in terms of a process of establishing the call connection between users, and can be easily applied to the Internet environment since header information of a packet is composed of general texts such as HTTP. Moreover, advantageously, the SIP has a reduced connection load.

A Real-time Transport Protocol (RTP) is an application layer protocol that can transport packetized audio and video streaming traffic over a network. That is, the SIP serves to establish and release the call connection between users whereas the RTP serves to transmit multimedia data such as audio, video and the like. The RTP is executed based on a transport protocol called a "User Datagram Protocol (UDP)" which has no reliability but has the capability of delivering data, and provides timestamp in RTP header which is needed for real-time application and a media synchronization function.

As such, since the VoIP service is dividedly performed by both the SIP and the RTP, a VoIP traffic refers to a traffic including an SIP message and an RTP traffic. Accordingly, a VoIP anomaly traffic can be divided into an SIP-based anomaly traffic and an RTP-based anomaly traffic. The SIP-based anomaly traffic is an anomaly traffic related with the call connection. Examples of the SIP-based anomaly traffic include CANCEL Denial of Service (DoS) anomaly traffic in which when a user makes a phone call, this call connection is forcibly cancelled, and BYE DoS anomaly traffic in which the call of either one or two users is forcibly terminated during the phone call between the two users. Such SIP-based anomaly traffic involves a shortcoming in that only one packet can deactivate the VoIP service between users. On the other hand, the RTP-based anomaly traffic is an anomaly traffic based on RTP flooding attacks, in which a call connection is normally established but an actual phone call is problematic. In the RTP-based anomaly traffic, ineffective RTP packets are sent in a large quantity so that voice call quality is lowered or an abnormal sound is reproduced due to insertion of arbitrary data. In addition, since a current VoIP service is supported even in a wireless Internet environment, a malicious attacker can generate the anomaly traffic through sniffing normal VoIP traffic in a wireless network.

A currently used normal traffic detection method provides only an anomaly traffic detection function such as detection of DoS worm, virus and the like in a general network and is not configured to be suited for anomaly traffic detection intended for the VoIP service.

Therefore, there is a need for a method for detecting the anomaly traffic in a cost-effective way.

The above information disclosed in this Background section is only for enhancement of understanding of the background of the invention and therefore it may contain information that does not form the prior art that is already known in this country to a person of ordinary skill in the art.

SUMMARY

It is an object of the present invention to provide an anomaly traffic detection method and system for VoIP applications, which can effectively detect VoIP anomaly traffic in a VoIP service environment which is distinct from a general network environment Another object of the present invention provides a detection method for application anomaly traffic which can occur in the VoIP service environment using a wireless Internet which is currently increasing sharply.

To accomplish the above and other objects, according to one aspect, the present invention provides a method of detecting VoIP application anomaly traffic. The method comprises: (A) allowing a router to capture an IP packet of a VoIP flow being transmitted; (B) classifying the captured IP packet into an SIP message and a RTP traffic; (B) extracting header information from the classified SIP message and RTP traffic; (C) storing the extracted header information in the step (B) in a database; and (D) determining whether SIP-based anomaly traffic or RTP-based anomaly traffic is generated based on the extracted information and the information stored in the database.

Preferably, the method may further comprise visualizing a corresponding flow if it is determined in the step (D) that the anomaly traffic is generated.

Preferably, the header information may be in the form of an IP Flow Information eXport (IETF IPFIX) standard.

Preferably, the header information of the SIP message may comprise a message type, Call-ID, voice traffic connection information, and codec information.

Preferably, the header information of the RTP traffic may comprise sequence number and SSRC information.

Preferably, the step (D) may comprise: in the case where the SIP message of the VoIP flow is a BYE message, determining that BYE DoS anomaly traffic is generated based on the extracted header information in the step (B), if voice traffic is generated within a predetermined time after a BYE message is generated from media session information of an INVITE message and an OK message having the same CALL-ID and 4-tuple information as that of the BYE message in the database.

Preferably, the step (D) may comprise: in the case of RTP traffic, determining that RTP flooding anomaly traffic is generated (i) if RTP traffic having the same 4-tuple as that of the BYE message is searched in the database and SSRC has been changed, (ii) if the sequence number of the first packet of an RTP flow is larger than the sequence number of the last sequence of the RTP flow, the minimum sequence number in the RTP flow is smaller than the sequence number of the first packet or the maximum sequence number in the RTP flow is larger than the sequence number of the last packet, or (iii) if the sequence number of the first packet is smaller than the sequence number of the last packet, the minimum sequence number is larger than the sequence number of the last packet, or the maximum sequence number is smaller than the sequence number of the first packet.

If the router is a wireless access router, 802.11 header information may be extracted. In this case, the step (D) may comprise: in the case where the SIP message of the VoIP flow is a CANCEL message, determining that CANCEL DoS anomaly traffic is generated (i) if the source MAC addresses of an INVITE message and a CALL message are different from each other through searching an INVITE message having the same CALL-ID and 4-tuple as that of the CANCEL message in the database, or (ii) if a difference between the 802.11 MAC sequence number of an IP packet previous to the CANCEL message and the MAC sequence number of the CANCEL message is smaller than a predetermined value.

In another aspect, the present invention provides a system for detecting and monitoring VoIP application anomaly traffic. The system comprises (A) a VoIP traffic detection and analysis device for monitoring VoIP traffic in a router or a wireless access router disposed in a path between terminals and a proxy server and (B) a VoIP application anomaly traffic detection server. The VoIP traffic detection and analysis device may comprise: (a) an SIP/RTP traffic detector for capturing an IP packet of a VoIP flow being transmitted over a network and classifying the captured IP packet into an SIP message and a RTP traffic of VoIP traffic; (b) an SIP/RTP traffic analysis unit for extracting and analyzing header information from the classified SIP message and RTP traffic; (c) an SIP/RTP flow creation unit for creating an SIP/RTP flow table from the analyzed header information; and (d) an IPFIX flow transmitter for creating an IPFIX flow from the created SIP/RIP flow table and transmitting the created IPFIX flow. The VoIP application anomaly traffic detection server may comprise: (a) an IPFIX flow receiver for receiving the IPFIX flow from the VoIP traffic detection and analysis device; (b) a database for analyzing the received IPFIX flow and storing the header information of the SIP/RIP traffic therein; and (c) a VoIP anomaly traffic detector for comparing the SIP/RIP traffic information with the information stored in the database and determining whether or not VoIP anomaly traffic is generated.

Preferably, the VoIP application anomaly traffic detection server may further comprise a VoIP anomaly traffic visualizing unit for visualizing a corresponding flow if the VoIP anomaly traffic detector determines that anomaly traffic is generated.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Reference will now be made in detail to preferred embodiments of the present invention with reference to the attached drawings. However, these embodiments are merely illustrative and the present invention is not limited thereto.

Figure 1:
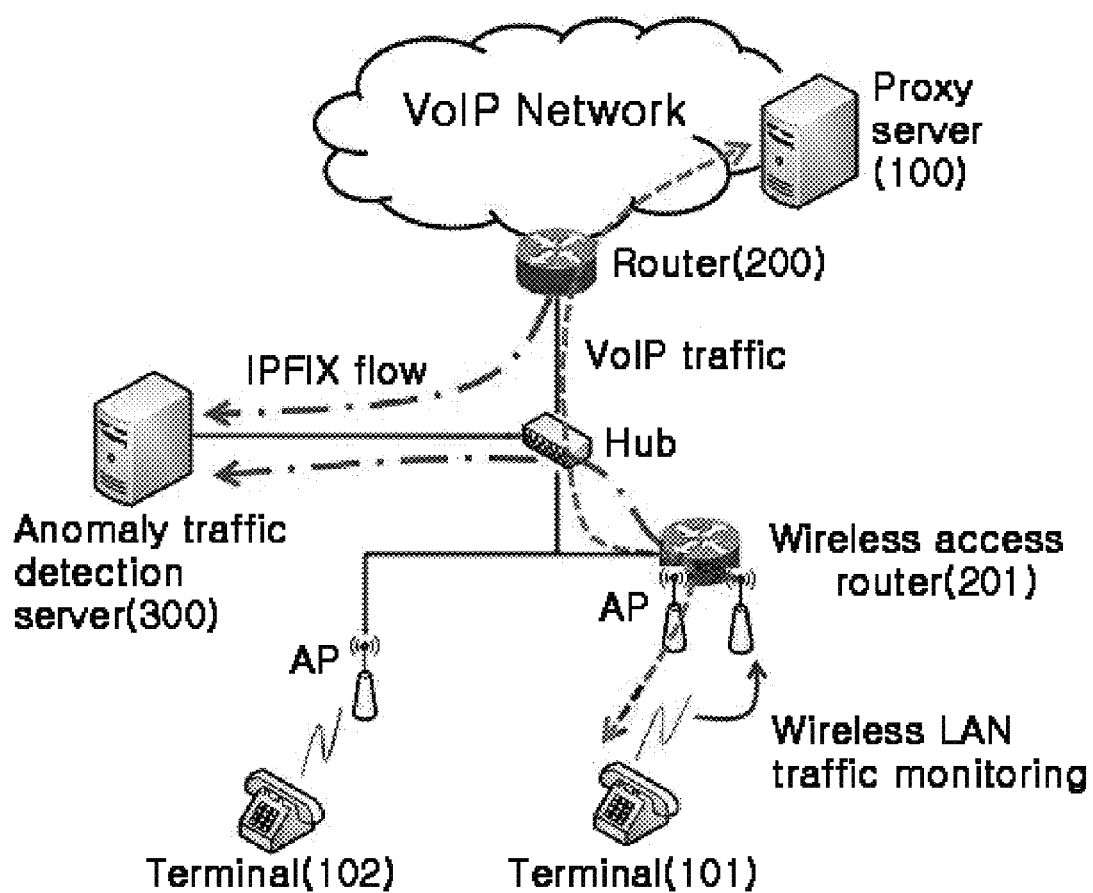
FIG. 1 is a schematic view illustrating detection of VoIP application anomaly traffic using SIP/RIP according to a preferred embodiment of the present invention.

FIG. 1 is a schematic view illustrating detection of VoIP application anomaly traffic using SIP/RTP according to a preferred embodiment of the present invention.

Referring to FIG. 1, terminals 101 and 102 transmit VoIP traffic therebetween through a proxy server 100. For instance, as shown in FIG. 1, traffic transmitted from the terminal 101 can be delivered to the proxy server 100 through a wireless access router 201 and a router 200, and traffic transmitted from the terminal 102 can be delivered to the proxy server 100 through the router 200, respectively. The data transmission is not limited thereto and can be carried out in various ways. For example, both the terminals 101 and 102 can transmit data through the wireless access router 201 or the router 200.

In one aspect, the present invention provides a method for detecting anomaly traffic for VoIP applications. The method includes the steps of: (A) allowing a router or a wireless access router to capture an IP packet of a VoIP flow being transmitted and classifying the captured IP packet into an SIP message and a RTP traffic; (B) extracting header information from the classified SIP message and RTP traffic; (C) storing the extracted header information in a database; and (D) determining whether SIP-based anomaly traffic or RTP-based anomaly traffic is generated based on the extracted information and the information stored in the database.

In this case, it is assumed that the SIP message employs a source and destination port number 5060. The header information of the SIP message in the step (B) may include a message type, Call-ID, voice traffic connection information, and codec_information. The message type represents which function the SIP message performs and can be divided into, e.g., an INVITE message, a BYE message, an ACK message, a CANCEL message, a REGITER message and an OPTION message. The Call-ID is an ID created when a user uses VoIP applications. The voice traffic connection information represents source and destination IP address and port number for voice traffic communication between users after a call connection request. The codec information represents a voice compression method used upon the transmission of voice traffic.

Sequence number and Synchronization SourRCe (SSRC) information is extracted from a header of RTP traffic. The sequence number of an RTP header is incremented one by one each time an RTP packet is transmitted, and the SSRC information is a value used for synchronization with respect to the call during the voice call between users. In the case of a normal phone call, the SSRC information is not changed during the maintenance of the phone call.

Preferably, the extracted header information in the step (B) is in the form of an IP Flow Information eXport (IETF IPFIX) standard. The IETF IPFIX is a standard relating to IP flow measurement and transmission, which flexibly manages the values of the flow creating time, the termination time, the number of packets, the number of bites through classification of an IP packet received through a router or a wireless access router into flows.

In an embodiment, the anomaly VoIP traffic detection method may further include a step of, if it is determined that the anomaly traffic is generated in the step (D), visualizing a determination result.

Figure 2:
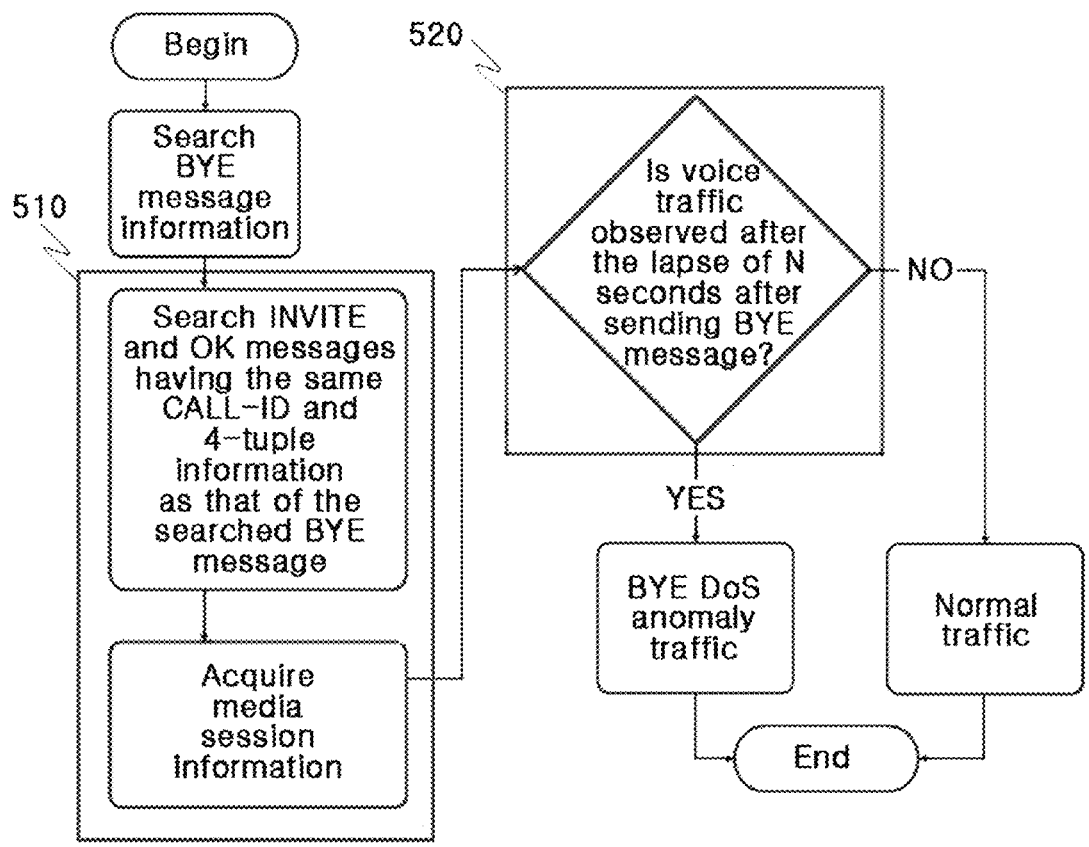
FIG. 2 is a flowchart illustrating a BYE DoS anomaly traffic detection process adopting a BYE DoS anomaly traffic detection algorithm that forcibly terminates the call of at least one user during a voice call between users in VoIP applications according to a preferred embodiment of the present invention.
Figure 3:
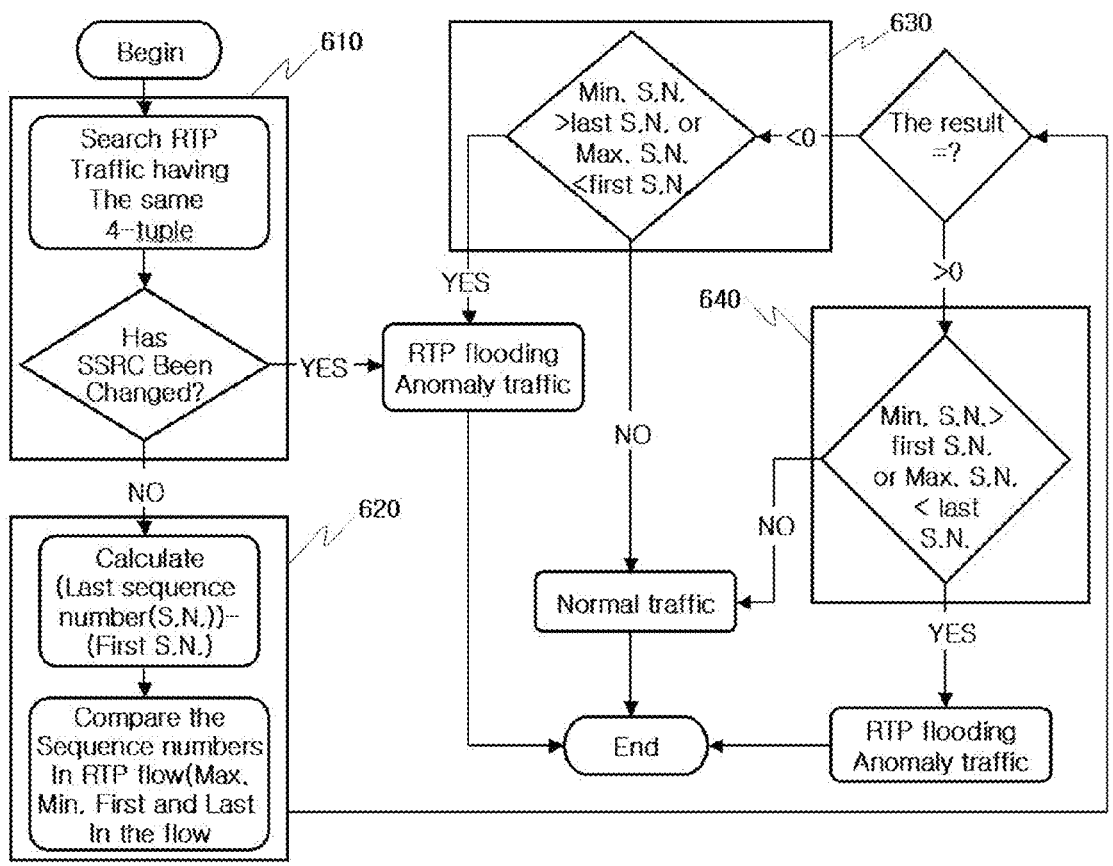
FIG. 3 is a flowchart illustrating an RTP flooding anomaly traffic detection process adopting an RTP flooding anomaly traffic detection algorithm. An RTP flooding anomaly traffic induces damage caused by lowering quality of the voice call between users in VoIP applications according to a preferred embodiment of the present invention.
Figure 4:
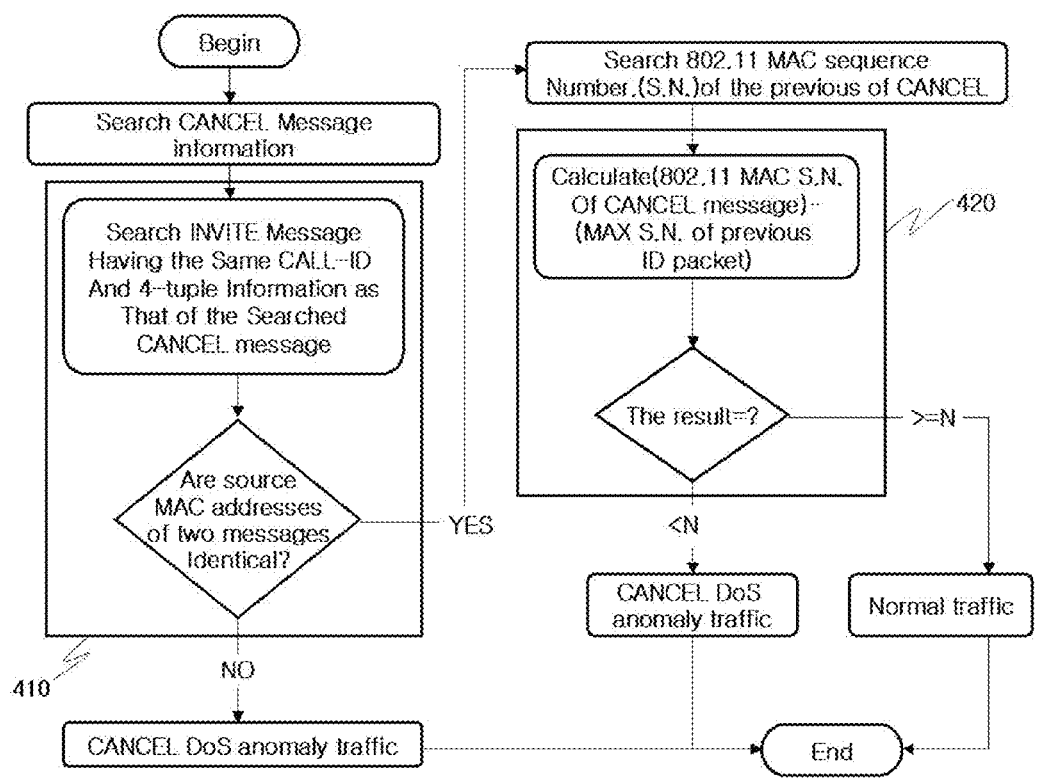
FIG. 4 is a flowchart illustrating a CANCEL DoS anomaly traffic detection process adopting a CANCEL DoS anomaly traffic detection algorithm. A CANCEL Dos anomaly traffic induces a call cancellation damage in VoIP applications according to a preferred embodiment of the present invention.

FIGS. 2 to 4 show flowcharts illustrating the method for determining whether or not the anomaly VoIP traffic is generated in the step (D) in more detail.

First, FIG. 2 is a flowchart illustrating a BYE DoS anomaly traffic detection process adopting a BYE DoS anomaly traffic detection algorithm that forcibly terminates the call of at least one user during a voice call between users in VoIP applications.

In FIG. 2, the BYE DoS anomaly traffic detection process is performed by a voice traffic connection information acquisition unit 510 and a voice traffic time information checking unit 520.

The acquisition of the voice traffic connection information brings voice call connection information from a result obtained by monitoring INVITE and OK massages including the same CALL-ID and 4-tuple (IP source and destination IP address and port number) information as that of the BYE message. The voice traffic time information checking unit 520 checks the time when RTP traffic having the same connection information is monitored in a router using this voice call connection information. In this case, if RTP traffic is monitored even after the lapse of a predetermined time after BYE traffic is generated, it can be considered that unintended BYE traffic is generated, thereby determining that BYE DoS anomaly traffic is generated. Of course, the predetermine time must be appropriately applied, but preferably, if voice traffic is detected within 1 to 5 seconds after transmission of BYE traffic, it is determined that RTP-based anomaly traffic is generated.

FIG. 3 is a flowchart illustrating an RTP flooding anomaly traffic process using RTP traffic used upon transmission of voice traffic in VoIP applications.

In FIG. 3, the RTP flooding anomaly traffic detection process is performed by an RTP header SSRC value checking unit 610, an RTP header sequence number calculator 620, and sequence number comparators 630 and 640. The RTP header SSRC value checking unit 610 servers to check whether or not an SSRC value is changed in a monitored RTP flow. In the case of a normal phone call, the SSRC information is not changed during the maintenance of the phone call. Thus, if the SSRC value has been change in the monitored RTP flow, it can be determined that anomaly traffic is generated.

In the meantime, even though the SSRC value has not been changed, there is a possibility that a malicious attacker will arbitrarily set the SSRC value such that the SSRC value is equal to a value used in normal RTP traffic and use the set SSRC value, and thus it is necessary to detect additional generation of anomaly traffic using the RTP sequence number. The RTP header sequence number calculator 620 calculates a difference in the sequence numbers of the first packet and the last packet in an RTP flow. If the difference between the sequence numbers is smaller than 0, the sequence number is used up to 65535 in the RTP flow. In this case, since the sequence number has been again used from 0, the comparison of the sequence number must be applied differently from the case where the difference between the sequence numbers is larger than 0. Therefore, a comparison step in the case where the difference between the sequence numbers is smaller than 0 is performed by the sequence number comparator 630, and a comparison step in the case where the difference between the sequence numbers is larger than 0 is performed by the sequence number comparator 640. That is, the sequence number comparator 630 detects anomaly traffic if the minimum sequence number is larger than the last sequence number or the maximum sequence number is smaller than the first sequence number in the RTP flow, and the sequence number comparator 640 detects anomaly traffic if the minimum sequence number is smaller than the first sequence number or the maximum sequence number is larger than the last sequence number in the RTP flow.

Meanwhile, in the case of a VoIP service based on the wireless Internet environment, since a malicious attacker can generate anomaly traffic through sniffing normal VoIP traffic in the wireless network, it is necessary to additionally compare header information of 802.11.

FIG. 4 is a flowchart illustrating a CANCEL DoS anomaly traffic detection process using a monitoring result of VoIP traffic with respect to a CANCEL DoS anomaly traffic that cancels a phone call between users in VoIP applications in a VoIP service based on the wireless Internet environment.

In FIG. 4, the CANCEL DoS anomaly traffic detection process is performed by a source MAC address checking unit 410 and a checking unit 420 using the sequence number of 802.11 MAC header.

Referring to FIG. 4, if it is determined that an SIP message is a CANCEL message based on the header information of a detected SIP message, the source MAC address checking unit 410 searches an INVITE message containing the same CALL-ID and 4-tuple (IP source and destination IP address and port number) information as that of the SIP message from a database. Then, the source MAC address checking unit 410 compares source MAC addresses extracted from the 802.11 header information of the CANCEL message and the INVITE message. In the case of a normal CANCEL message, since it is a CANCEL message sent by a user agent client (UAC) making a phone call, the source MAC addresses of the INVITE message and the CALL message will be identical to each other. Therefore, if the source MAC addresses of the INVITE message and CALL messages are not identical to each other, the source MAC address checking unit 410 determines that VoIP anomaly traffic is generated.

Even if the source MAC addresses of the INVITE message and CALL messages are identical to each other, there is a possibility that a malicious attacker will generate anomaly traffic through copying (i.e., spoofing) the source MAC address of the normal traffic as it is in the wireless LAN environment. Thus, the checking unit 420 using the sequence number of 802.11 MAC header additionally performs detection of the CALL DoS anomaly traffic using this sequence number. More specifically, the source MAC address checking unit 410 compares the MAC sequence number of an IP packet previous to the CANCEL message with the MAC sequence number of the CANCEL message if the source MAC addresses of the INVITE message and CALL messages are identical to each other. If a difference in the MAC sequence numbers is smaller than a predetermined value, it is determined that CANCEL DoS anomaly traffic is generated. Since the difference in the MAC sequence numbers can be properly adjusted depending on a network environment, a value of approximately 5 is preferably used. The reason why the difference in the MAC sequence numbers is set to the value is that a packet which does not use an IP layer between the terminal and the access point exists between the CANCEL packet the previous IP packet. Since these packets are ones transmitted and received in the 802.11 environment, they exist in only the 802.11 MAC header.

In another aspect, as discussed above, the present invention provides a system for detecting and monitoring VoIP application anomaly traffic.

The system includes: (A) a VoIP traffic detection and analysis device for detecting VoIP traffic in a router or a wireless access router and extracting header information of an SIP message and an RTP traffic from the detected VoIP traffic; and (B) a VoIP application anomaly traffic detection server for determining whether or not VoIP anomaly traffic is generated based on the header information obtained from the VoIP traffic detection and analysis device and visualizing a determination result.

Figure 5:
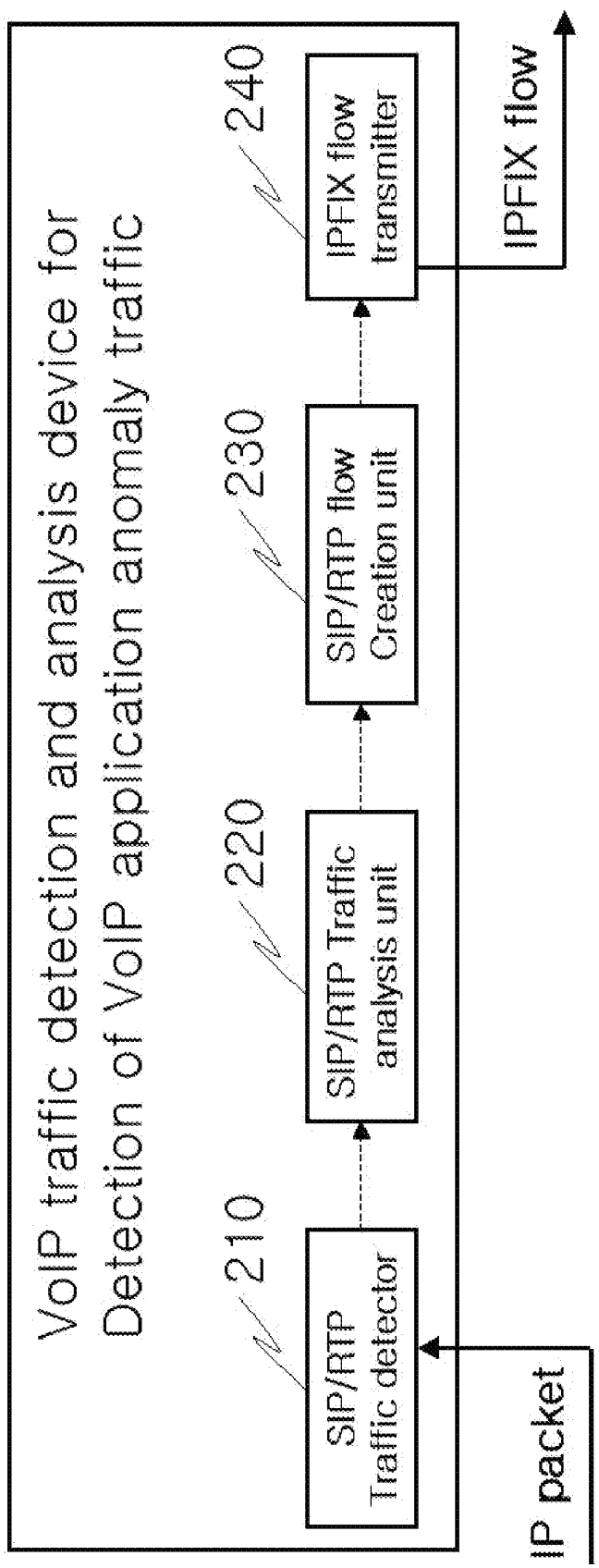
FIG. 5 is a schematic block diagram illustrating a VoIP traffic detection and analysis device of a VoIP application anomaly traffic detection system according to an embodiment of the present invention.
Figure 6:
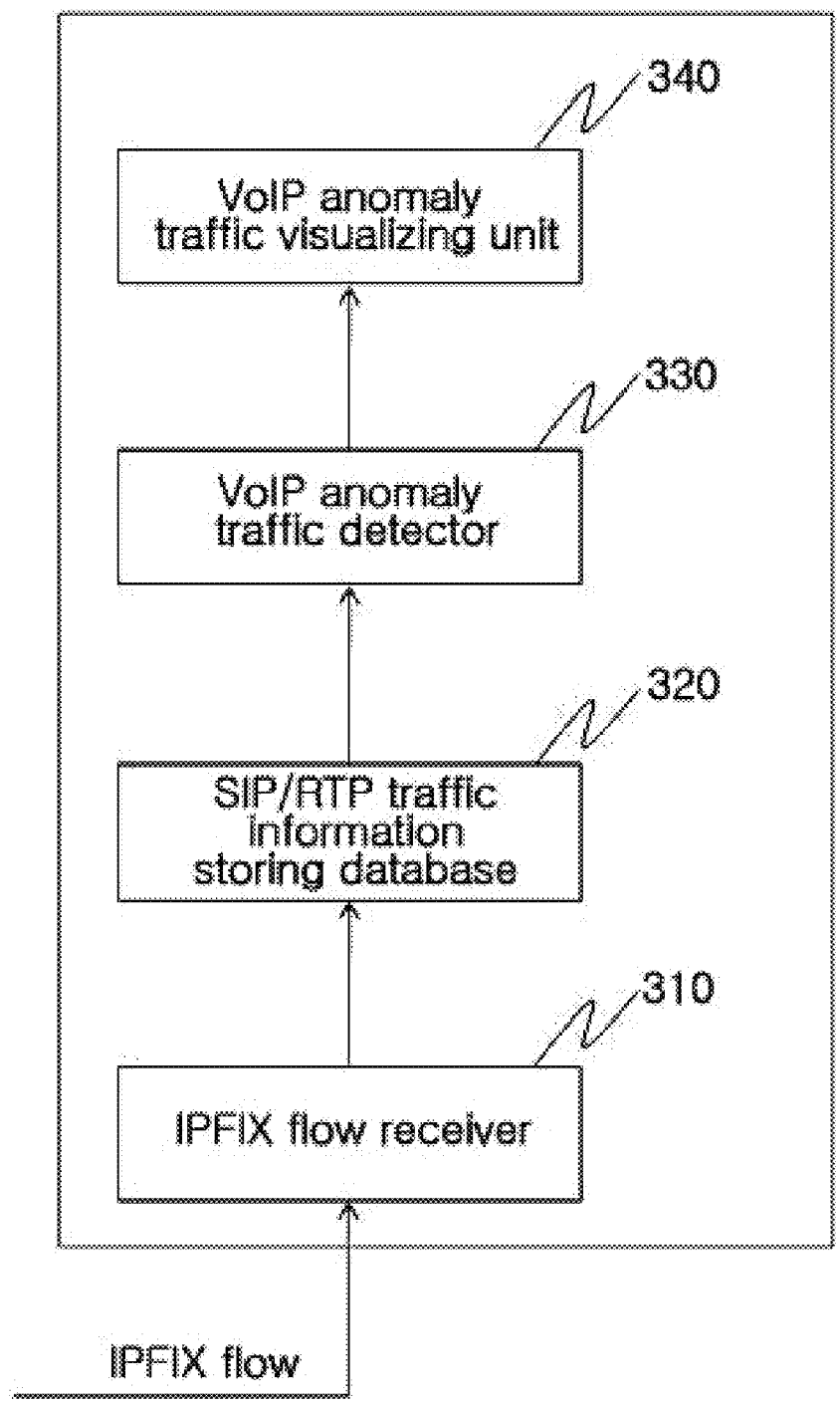
FIG. 6 is a schematic block diagram illustrating a VoIP application anomaly traffic detection server of a VoIP application anomaly traffic detection system according to an embodiment of the present invention.

FIG. 1 schematically shows an entire system, and FIGS. 5 and 6 schematically show a VoIP traffic detection and analysis device and a VoIP application anomaly traffic detection server, respectively.

First, the VoIP traffic detection and analysis device of FIG. 5 monitors VoIP traffic in a router or a wireless access router disposed in a path between terminals and a proxy server.

The VoIP traffic detection and analysis device includes: (a) an SIP/RIP traffic detector 210 for capturing an IP packet of a VoIP flow being transmitted over a network and classifying the captured IP packet into an SIP message and a RTP traffic of VoIP traffic; (b) an SIP/RIP traffic analysis unit 220 for extracting and analyzing 802.11 header information from the classified SIP message and RTP traffic; (c) an SIP/RIP flow creation unit 230 for creating an SIP/RIP flow table from the analyzed header information; and (d) an IPFIX flow transmitter 240 for creating an IPFIX flow from the created SIP/RIP flow table and transmitting the created IPFIX flow.

The SIP/RIP flow creation unit 230 collects traffic from an interface over a network on which traffic is monitored, and manages a flow table for SIP traffic and RTP traffic of these traffic. If the collected SIP and RTP traffic is a new flow, the SIP/RIP flow creation unit 230 creates a flow table. If there exists a previously stored flow, the SIP/RIP flow creation unit 230 updates all or some values of the flow table. The flow table used in the SIP/RIP flow creation unit 230 contains IP addresses and port numbers of these traffic, the header information of the SIP and RTP traffic, etc. Information stored in the flow table is maintained for a predetermined time before an IPFIX flow is created. The IPFIX flow transmitter 240 creates the IPFIX flow using information stored in the flow table after the lapse of the predetermined time, and deletes information of the flow table. The created IPFIX flow is transmitted to the VoIP application anomaly traffic detection server 300 through the IPFIX flow transmitter 240.

FIG. 6 shows the structure of the VoIP application anomaly traffic detection server.

The VoIP application anomaly traffic detection server includes: (a) an IPFIX flow receiver 310 for receiving the IPFIX flow from the VoIP traffic detection and analysis device; (b) a database 320 for analyzing the received IPFIX flow and storing the header information of the SIP/RIP traffic therein; and (c) a VoIP anomaly traffic detector 330 for comparing the SIP/RIP traffic information with the information stored in the database and determining whether or not VoIP anomaly traffic is generated.

The VoIP application anomaly traffic detection server may further include a VoIP anomaly traffic visualizing unit 340 for visualizing a corresponding flow if the VoIP anomaly traffic detector determines that anomaly traffic is generated.

As described above, according to the present invention, since anomaly traffic detection for VoIP applications is possible through the observation of VoIP traffic over a network, a more efficient Internet telephony service can be provided. In addition, since both a VoIP service provider and an Internet service provider can detect VoIP application anomaly traffic, anomaly traffic can be prevented effectively.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of detecting anomaly traffic in Voice over Internet Protocol (VoIP) application, the method comprising the steps of:
    (A) allowing a router to capture an IP packet of a VoIP flow being transmitted;
    (B) classifying the captured IP packet into a Session Initiation Protocol (SIP) message and a Real-time Transport Protocol (RTP) traffic;
    (B) extracting header information from the classified SIP message and RTP traffic;
    (C) storing the extracted header information in the step (B) in a database; and
    (D) determining whether SIP-based anomaly traffic or RTP-based anomaly traffic is generated based on the extracted information and the information stored in the database,
    wherein the step (D) comprises: in the case of RTP traffic, determining that RTP flooding anomaly traffic is generated (i) if RTP traffic having the same 4-tuple as that of the BYE message is searched in the database and Sequence number and Synchronization SourRCe (SSRC) has been changed, (ii) if the sequence number of the first packet of an RTP flow is larger than the sequence number of the last sequence of the RTP flow, the minimum sequence number in the RTP flow is smaller than the sequence number of the first packet or the maximum sequence number in the RTP flow is larger than the sequence number of the last packet, or (iii) if the sequence number of the first packet is smaller than the sequence number of the last packet, the minimum sequence number is larger than the sequence number of the last packet, or the maximum sequence number is smaller than the sequence number of the first packet.

2. The method according to claim 1, further comprising the step of extracting 802.11 header information in the step (B) if the router in the step (A) is a wireless access router.

3. The method according to claim 2, wherein the step (D) comprises:

in the case where the SIP message of the VoIP flow is a CANCEL message, determining that CANCEL DoS anomaly traffic is generated (i) if the source MAC addresses of an INVITE message and a CALL message are different from each other through searching an INVITE message having the same CALL-ID and 4-tuple as that of the CANCEL message in the database, or (ii) if a difference between the 802.11 MAC sequence number of an IP packet previous to the CANCEL message and the MAC sequence number of the CANCEL message is smaller than a predetermined value.

4. The method according to claim 2, wherein the 802.11 header information comprises sequence number and source and destination MAC address information.

5. The method according to claim 1, further comprising a step of, if it is determined in the step (D) that the anomaly traffic is generated, visualizing a corresponding flow.

6. The method according to claim 1, wherein the header information extracted in the step (B) is in the form of an IP Flow Information eXport (IETF IPFIX) standard.

7. The method according to claim 1, wherein the header information of the SIP message comprises a message type, Call-ID, voice traffic connection information, and codec information.

8. The method according to claim 1, wherein the header information of the RTP traffic comprises sequence number and SSRC information.

* * * * *